Dec. 2, 1924.

W. C. SPECK 1,517,259

CULTIVATOR ATTACHMENT

Filed Nov. 1, 1920

INVENTOR
William C. Speck
BY John M. Spillman
ATTORNEYS.

Patented Dec. 2, 1924.

1,517,259

UNITED STATES PATENT OFFICE.

WILLIAM C. SPECK, OF LAMESA, TEXAS.

CULTIVATOR ATTACHMENT.

Application filed November 1, 1920. Serial No. 421,091.

*To all whom it may concern:*

Be it known that I, WILLIAM C. SPECK, a citizen of the United States, residing at Lamesa, in the county of Dawson and State of Texas, have invented certain new and useful Improvements in Cultivator Attachments, of which the following is a specification.

This invention relates to new and useful improvements in cultivators and has more particular reference to an attachment for cultivators for cultivating any row crop such as corn, cotton and the like, and aims to provide an attachment to be used in cutting weeds, cultivating between the rows and particularly designed and adapted to cultivate or remove weeds growing very close to the plant. It can also be used to advantage in harvesting beans, peas and such like, that is, to clip the stem of the vines close to the ground. The device can be attached to any standard type of cultivator, and may be adjusted to suit width of rows.

The invention will be more clearly understood from the following description taken in connection with the accompanying drawing forming part hereof, in which—

Figure 1:
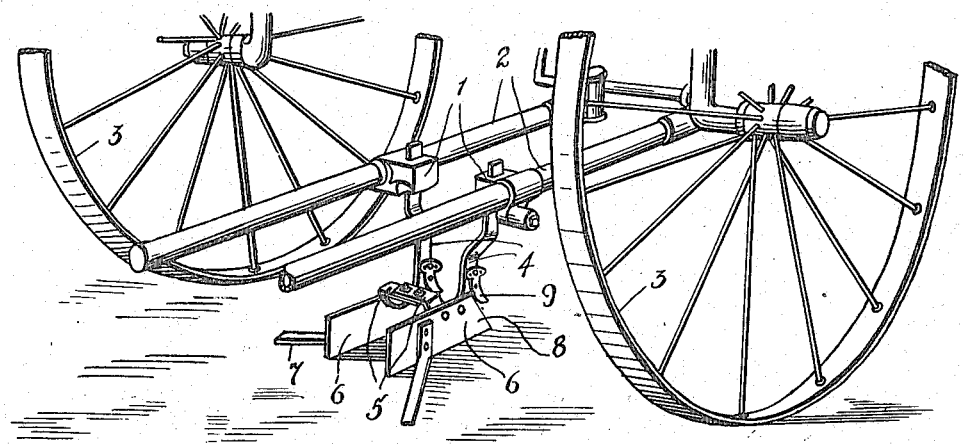
Figure 1 is a perspective view, partly broken away, of a cultivator of standard type and construction, embodying the invention.
Figures 2, 3, 4:
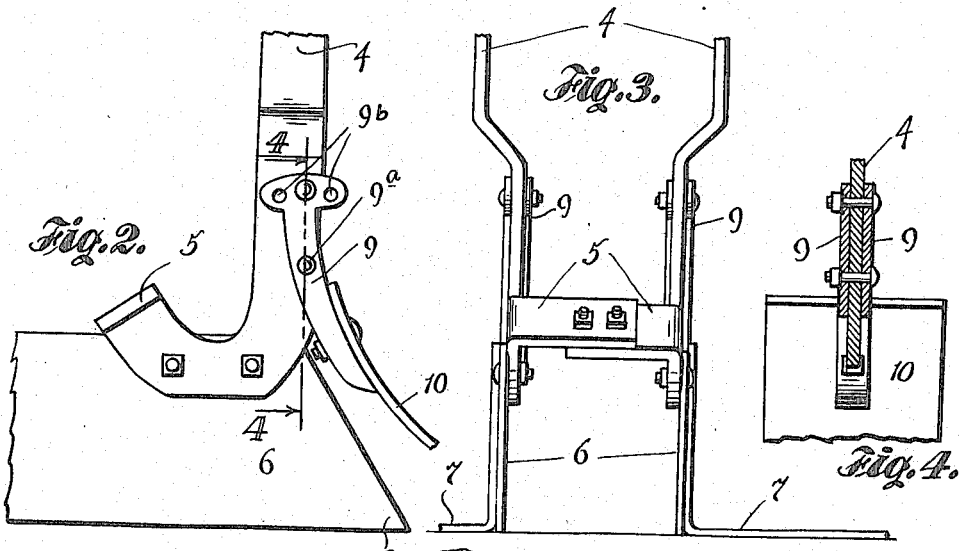
Figure 2 is a side elevational view of the device removed from the cultivator with part broken away.
Figure 3 is a rear elevational view.
Figure 4 is a sectional view taken on line 4—4, Figure 2.

Referring more in detail to the drawings, the device is attached by means of the usual form of sleeve 1 to the beams 2—2 of a cultivator suported upon the wheels 3—3, and is composed of the angular downwardly extending legs or shanks 4—4. The legs 4—4 are curved rearwardly from their main body portion and bent over at right angles to form the laterals 5—5 which are bolted together as shown in Figure 3 and by an arrangement of perforations and bolts may be operated to widen or narrow the device. Each leg or shank 4 is connected to a runner member 6 as shown in Figure 1 and to the rear of each runner member 6 is a knife 7 having an oblique relationship thereto.

The attachment or device is intended to straddle a row of plants and to cultivate the soil and remove weeds from close to the plants as desired. By adjusting the laterals 5—5 and legs or shanks 4—4 the runner members 6—6 may be spaced to suit requirements, the runner members being intended to protect the plants from too close cultivation or damage and the pointed ends of the runner members as at 8—8 operating to slightly break the soil and as a guide for alinement with the row. The knives 7—7 are designed to cut the weeds between the rows. In some instances where the soil crust is relatively hard, in addition to the runner members 6, I provide the auxiliary foot pieces 9 comprising two parts, one on each side of the leg or shank 4 and bolted together as illustrated in Figures 3 and 4. A shovel 10 is then connected to the footpiece. In this manner the soil which is hard can be broken to better advantage. The foot pieces 9 are pivoted at $9^a$ to the leg 4 and perforations $9^b$ are placed in the upper end for adjustment to the proper angle.

Figure 5:
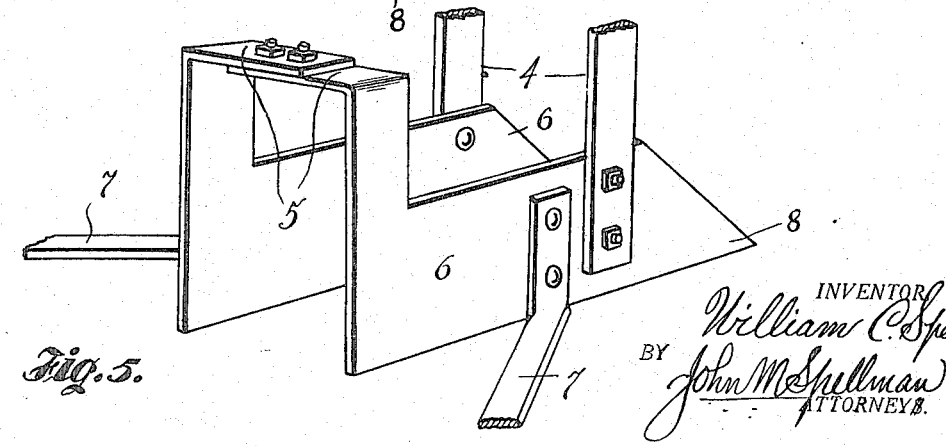
Figure 5 is a modified form of the attachment.

In the modified form shown in Figure 5 the runners 6 are formed integrally with the laterals 5—5 and the legs or shanks 4—4 terminate at the front of the runners and are connected thereto by bolts. It is understood that the legs or shanks 4—4 may be either flat or round.

Having thus described the nature and objects of the invention, what I claim as new and desire to secure by Letters Patent is—

1. An attachment for cultivators in combination with the cultivator beams, consisting of a pair of angular legs or shanks extending downwardly from the cultivator beams and having lateral extensions for spacing and holding the leg or shanks apart to straddle a row of plants, said legs removably attached to a pair of runner members, said runner members designed to protect the plants, to align the device with the rows and to slightly penetrate the soil, knives attached to the runner members, means for adjusting the space between the runner members and shanks, and means for removably attaching a shovel to each shank.

2. An attachment for cultivators in combination with the cultivator beams, consisting of a pair of angular legs or shanks extending downwardly from the cultivator beams, a pair of runners removably attached to the shanks or legs for aligning the device with the row and to slightly penetrate the soil, the runners provided with laterals for adjustment over a row, knives on the runners, and auxiliary legs adjustably connected to the shanks for attaching shovels to the auxiliary legs and shanks.

In testimony whereof I have signed my name to this specification.

WILLIAM C. SPECK.